United States Patent [19]

Kirchner

[11] 4,421,158
[45] Dec. 20, 1983

[54] COOLANT RECIRCULATION SYSTEM FOR DRY CLEANING PLANTS

[76] Inventor: Robert D. Kirchner, 1816 Remson Ave., Merrick, N.Y. 11566

[21] Appl. No.: 263,798

[22] Filed: May 14, 1981

[51] Int. Cl.³ .................. B60H 1/00; B61D 27/00; F28F 27/00
[52] U.S. Cl. .................. 165/40; 122/406 R; 122/451.1; 34/77; 134/107; 134/108
[58] Field of Search .......... 34/77; 165/47, 40; 122/406 S, 406 R, 412, 451.1; 134/105, 107, 108; 137/563

[56] References Cited

U.S. PATENT DOCUMENTS

| | | | |
|---|---|---|---|
| 2,915,298 | 12/1959 | Hamlin et al. | 257/288 |
| 3,212,563 | 10/1965 | Schrader | 165/45 |
| 3,323,335 | 6/1967 | Schneider | 68/18 |
| 3,550,677 | 12/1970 | Knowles | 165/108 |
| 3,648,765 | 3/1972 | Starr | 165/39 |
| 3,858,627 | 1/1975 | Hinxlage | 134/108 |
| 3,926,743 | 12/1975 | Cywin | 122/7 R |
| 4,046,189 | 9/1977 | Clark, Jr. | 165/39 |
| 4,191,348 | 3/1980 | Holwerda | 137/340 |
| 4,240,499 | 12/1980 | Kabs | 165/40 |
| 4,260,011 | 4/1981 | Brown | 165/51 |
| 4,341,263 | 7/1982 | Arkakian | 165/40 |
| 4,367,785 | 1/1983 | Allen | 137/563 |

Primary Examiner—Albert W. Davis, Jr.
Assistant Examiner—S. Gayle Dotson

[57] ABSTRACT

A coolant recirculating system permits water from a municipal source to be circulated continuously in a dry cleaning plant in order to perform necessary cooling and condensing operations. The water is permitted to be dumped from the closed system only upon exceeding a temperature at which its cooling function has reduced efficiency. An additional benefit of the inventive closed circulating coolant loop is that the preheated water may be employed to supply a boiler in the dry cleaning plant and also that the loop water may be utilized in the lavatory facilities of the dry cleaning plant and in the laundry facilities of such dry cleaning plant.

14 Claims, 2 Drawing Figures

COOLANT RECIRCULATION SYSTEM FOR DRY CLEANING PLANTS

BACKGROUND OF THE INVENTION

The present invention relates to dry cleaning facilities and specifically relates to a system for recirculating a coolant employed in conjunction with the dry cleaning fluids.

The dry cleaning industry has long utilized various approaches to recondition or rehabilitate the various solvents employed as the dry cleaning fluids, and the use of apparatus such as condensing stills and the like is well known. Typical of dry cleaning fluids are the well known carbon tetrachloride and perchloroethylene. Nevertheless, whatever the dry cleaning fluid employed, it will be a petroleum distillate. Needless to say the costs of such petroleum distillates have risen to the point where recovery and reconditioning of same has become economically important. Additionally, federal and state regulations, such as those promulgated by OSHA, have required various types of vapor collection and the like in order to reduce health hazards to the dry cleaning plant personnel.

When reclaiming or reconditioning dry cleaning solutions or fluids, it is known to utilize a reclaimer condensor to condense the vapors and also to use a still or the like to separate the impurities from the dry cleaning solution. Both of these units require a supply of coolant for efficient operation, and conventional practice is to utilize a continuous flow of water from the municipal water supply as such coolant. Additionally, perchloroethylene dry cleaning fluid must be used at a relatively low temperature in order to maintain its efficiency. As is known, the cleaning fluid is best maintained below 90° F. because the detergent added to the cleaning fluid loses its ability to hold "free" water. Even a few ounces of free water in as much as 100 gallons of perchloroethylene will cause wrinkling and color loss in some fabrics (e.g., silk and cotton) just as if they had been placed in a conventional washing machine. This cooling operation is done with a coolant coil which typically also receives its low temperature coolant from the municipal water supply main. Also, what is commonly known as a "sniffer" may optionally be employed where required by occupational regulations, and this serves to capture the dry cleaning fluid vapors from the air and to prevent adverse contact with the operating personnel. The sniffer condenses perchloroethylene from the air that is passed through a charcoal filter. From time to time, two to five days a week, for an hour at a time, live steam is driven through the charcoal filter, thereby vaporizing the perchloroethylene in the charcoal. The steam and perchloroethylene vapors are then passed through the sniffer cooling coils and the condensed perchloroethylene and water are separated. This perchloroethylene is then ready for reuse.

Again, all of these condensers, stills, sniffers and the like employ coolant coils through which the readily available cold water from the municipal water supply is continuously permitted to flow. Of course, some dry cleaning facilities may have their own well but, nevertheless, the water used for cooling is the same water that is available for use throughout the dry cleaning facility.

Now, in the past it has been the practice simply to connect the exit sides of the cooling coil to the drain and to permit the water to flow continuously through the coils. This system works well and without problems, however, in many areas of the country not only is there a water supply problem, but also water rates have risen to the point where the economics of the coolant water supply have increased the cost of providing dry cleaning services. Moreover, some municipalities are restricting the quantities of water permitted for various industrial and home uses.

SUMMARY OF THE INVENTION

The present invention teaches a coolant recirculation system wherein the various coolant coils of the individual dry cleaning condensing and reconditioning units contained within the dry cleaning plant are interconnected to recirculate the coolant, i.e., the cold water from the municipal supply, until such water reaches a temperature where its cooling efficiency is reduced. At such time, the heated water is dumped down the sewer or waste line and fresh or cold water fed in from the municipal water supply main.

Additionally, dry cleaning plants invariably employ steam pressers to press and remove wrinkles from the various cleaned garments, with the steam typically provided by a steam boiler. The typical boiler installation has a make-up tank fed by the municipal water supply main or a pressure demand valve permitting a relatively direct connection to the water supply. The present invention contemplates the subsequent use of the preheated water from the circulating coolant system as the boiler water supply, thereby utilizing the energy already absorbed by the water during its cooling function. By using this preheated water the amount of energy needed to be added by the boiler is reduced. Additionally, as a further utilization of the useful water typically permitted to be dumped down the drain in a dry cleaning plant, the coolant water may be fed to the water supply in the lavatory or toilet for further utilization or could be used as a source of hot water in a laundry facility.

Accordingly, it is an object of the present invention to provide a coolant recirculating system for use in a dry cleaning plant which greatly reduces the amount of water required by the various cooling cores and condensors employed in the dry cleaning facility.

It is another object of the present invention to provide a coolant water recirculating system for dry cleaning plants wherein upon the recirculating coolant reaching a temperature which makes thermal transfer inefficient the water is dumped automatically and cooler water is added to the system from the main.

It is a further object of the present invention to provide a coolant recirculation system for use in a dry cleaning facility wherein the heated coolant water is utilized as preheated water to feed a boiler.

It is still a further object of the present invention to provide a recirculating coolant system for use in a dry cleaning plant wherein the recirculating water is also used as a supply for the dry cleaning facility lavatory.

The manner in which these other objects are accomplished by the present invention will become clear from the following detailed description.

DETAILED DESCRIPTION OF THE PREFERRED EMBODIMENT

Figure 1:
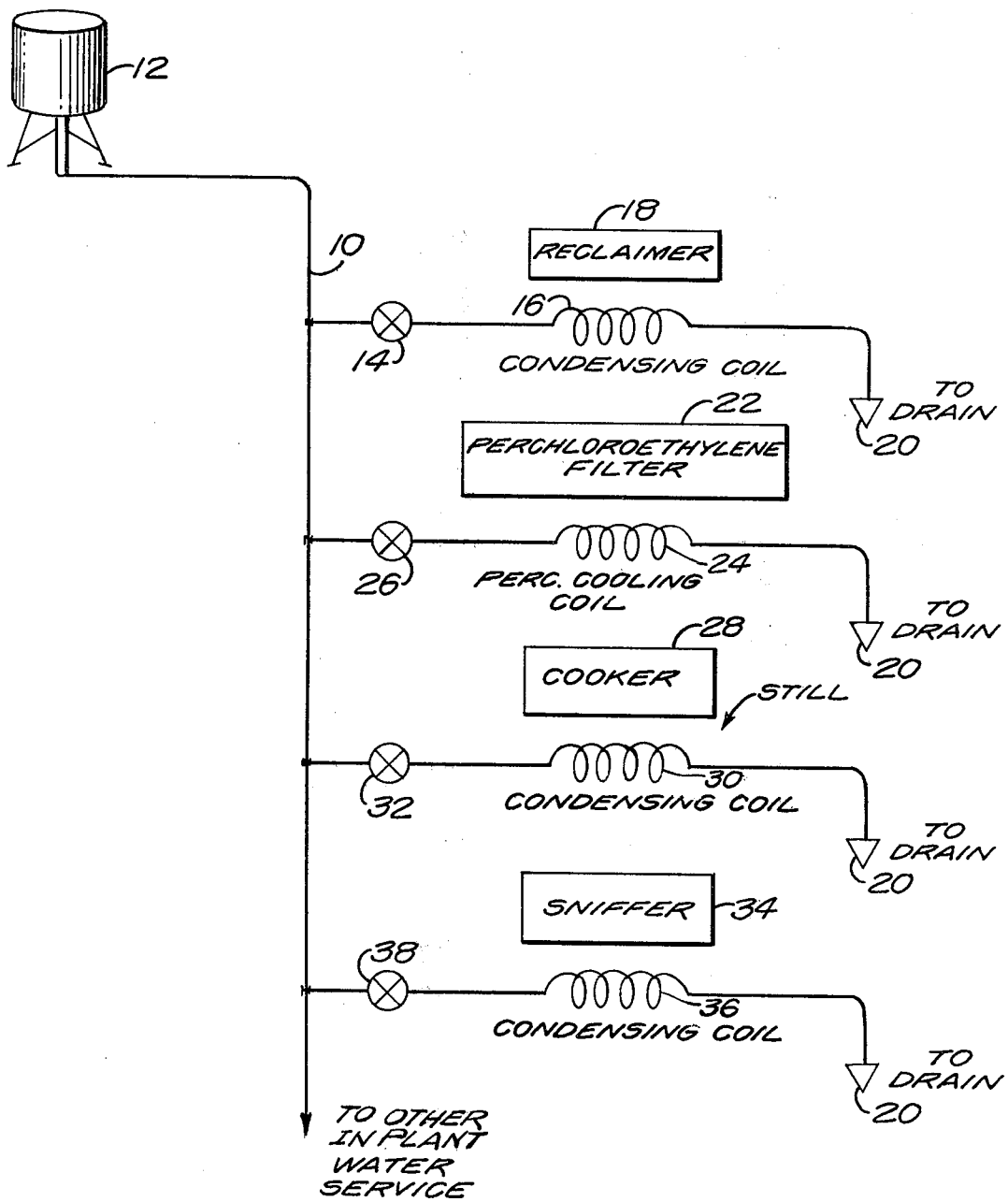
FIG. 1 is a prior art dry cleaning cooling facility in schematic form.

FIG. 1 shows a prior art system which might be used in a typical dry cleaning facility. It should be understood that not all dry cleaning facilities necessarily employ every one of the various units shown in FIG. 1. Nevertheless, in the interest of completeness the principal types of units are shown. Typically, the inlet main 10 to the dry cleaning facility is connected through public water mains and the like to the municipal water supply 12. This main water line 10 then is fed through a conventional manual valve 14 and through the condensing coil 16 of a reclaimer 18. The exit side of the condensing coil 16 is then connected to drain, sewer, or waste line 20 or alternatively to a dry well depending upon the locale. The reclaimer is the well known apparatus normally employed in many dry cleaning facilities and serves to reclaim dry cleaning fluid for reuse from just cleaning clothing. As pointed out above, in employing such reclaimer 18 it is necessary to condense the vaporized dry cleaning fluids and, thus, the condensing coil 16 is required. A dry cleaning facility may also employ a perchloroethylene filter 18 to filter the perchloroethylene and having a cooling coil 24 located inside the filter units. Nevertheless, the cooling coil 24 is independent of the perchloroethylene filter 22 and achieves its cooling by being connected to the input water line 10 through a manual valve 26. This manual valve 26 permits turning off the continuous water flow when not required. The exit side of the cooling coil 24 is again connected to the drain or waste line 20. Most dry cleaning facilities also employ a cooker and condensor which function as a still 28 in the conventional fashion, the still 28 requires a condensing coil 30 to accomplish its function, and this coil 30 is also connected to the input water line 10 by means of a manual valve 32. Once again, the output side of the condensing coil 30 of the still 28 is directly connected to the drain or waste line 20, and the coolant water continuously flows out into the drain 20. As pointed out above, some facilities also employ what is commonly known as a sniffer 34, which is employed to reclaim vapors in the dry cleaning facility. The perchloroethylene vapors and the steam are then passed over a condensing coil 36 which is also connected to the main water line 10 by a manual valve 38. The water supply line 10 then is connected to whatever other types of water requirements are in the dry cleaning facility. As can be seen from FIG. 1, the output waters from the various cooling and condensing coils are all dumped down the drain or sewer; this water is not contaminated, it has only been used as a coolant. It is this dumping which is an undesirable situation due to increased water costs and to reduced water availability.

Figure 2:
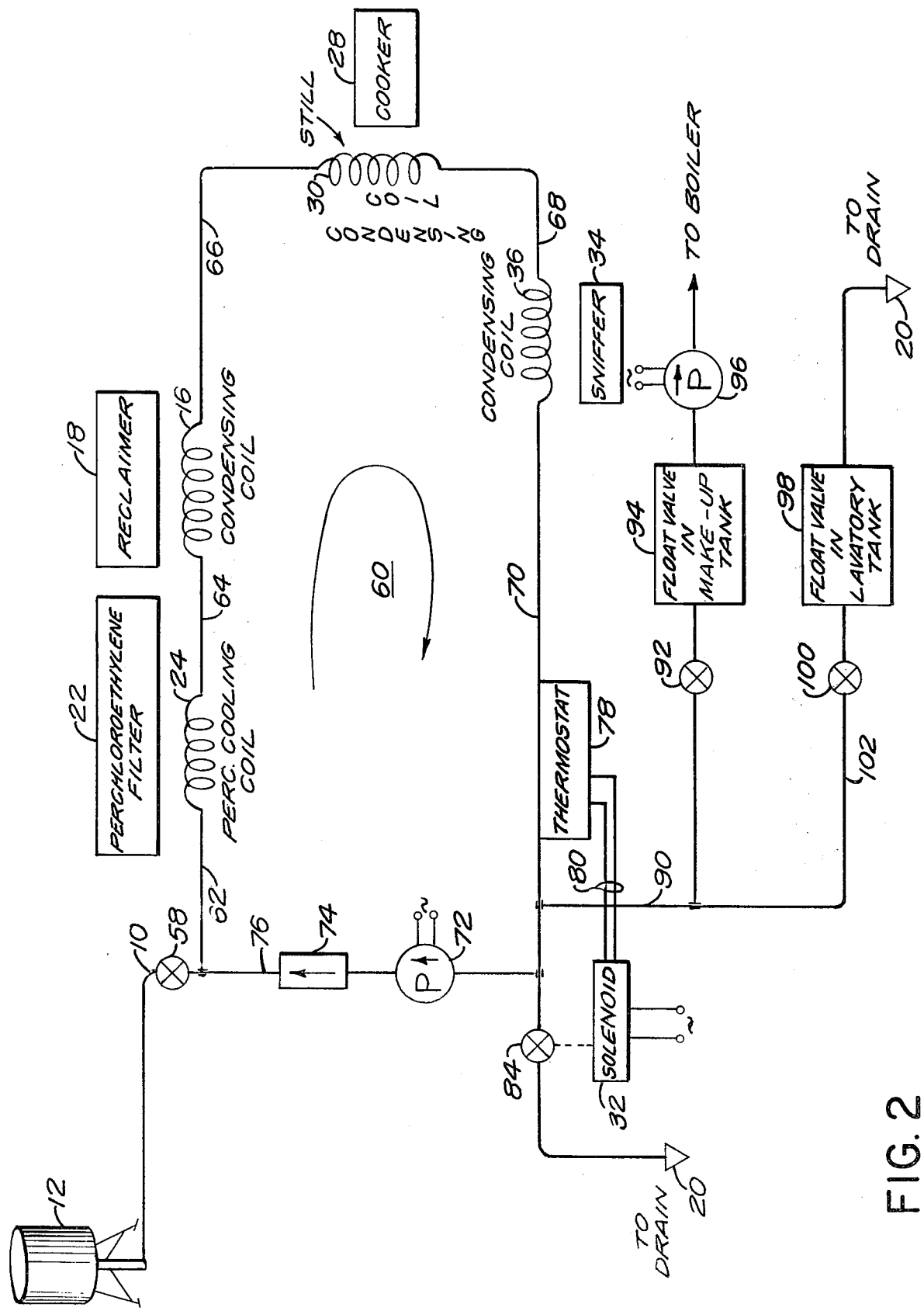
FIG. 2 is the inventive recirculating coolant system in schematic form.

FIG. 2 shows the system taught by the present invention in schematic form and, specifically, the municipal water supply 12 is again feeding the input water main 10 of the dry cleaning facility. The various kinds of devices discussed in relation to FIG. 1 can be connected in any order to the inlet water line 10. Similarly, the present invention is not limited in the arrangement of these several devices. Nevertheless, the arrangement shown in FIG. 2 has been found to provide advantageous results. A manual valve 58 serves to connect the input main 10 to the recirculating coolant loop 60 provided by the present invention. Specifically, water line 62 is connected to the output of valve 58 and feeds the perchloroethylene cooling coil 24 which operates in conjunction with the perchloroethylene filter 22. As opposed to simply dumping the output side of the perchloroethylene cooling coil 24 into the drain, as in FIG. 1, instead it is fed via pipe 64 to the inlet side of the condensing coil 16 of the reclaimer 18. In place of dumping the exit side of the condensing coil 16 into the waste line, as in FIG. 1, instead it is fed via pipe 66 to the input of condensing coil 30 of the cooker 28 of the still. The coolant loop 60 then continues with the exit of condensing coil 30 being fed via pipe 68 to the input of the condensing coil 36 of the sniffer 34. The coolant water output from sniffer condensing coil 36 is fed via pipe 70. This coolant line 70 is connected to a recirculating pump 72, the output of which is fed to a one way or direction limiting valve 74, whose output is connected via pipe 76 to line 62, completing the recirculating loop.

Connected in thermal contact with fluid coolant line 70 is a thermostat 78 which serves to monitor the temperature of the coolant water. This thermostat 78 can be in actual contact with the water in pipe 70 or it can be in thermal contact with the exterior of pipe 70. In either event some system calibration will probably be required. Once the thermostat 78 senses a water temperature above that which has been preselected, an electrical circuit is made by the thermostat 78, lines 80, and a solenoid or coil 82 of a normally closed valve 84, thereby energizing solenoid 82 and operating the valve 84. Solenoid operated valve 84 is the control valve which permits the water in the recirculating loop 60 to be dumped to the drain 20. When valve 84 is in its unenergized state (normally closed) the water flows from the condensing coil 36 through line 70 to the pump 72 and is recirculated around the loop 60. Alternatively, a thermally sensitive mechanical valve can be used in place of the electrically operated solenoid, e.g., a thermal valve such as an automobile cooling system thermostat.

In the system described above, the amount of coolant water required is vastly reduced, since the water is not continuously being dumped to the sewer or drain 20 but, rather, is recirculated through the closed loop 60. Once the valve 84 is actuated by the thermostat 78, the coolant water is dumped to the drain 20, this will reduce the water pressure within the coolant loop 60 and permit fresh water to flow in from the main 10. Water will flow into the coolant loop 60 while valve 84 remains open. Once the cooler water reaches the thermostat 78, valve 84 closes but water will continue to enter the loop until the pressure in the loop 60 equals the inlet main 10 pressure.

A further benefit provided by the present invention is that the heated water in coolant loop 60 can be put to other uses. To accomplish this an additional water line 90 is connected to line 70. Water line 90 is connected through a conventional manual valve 92 into the make-up tank 94 of the boiler located in the dry cleaning facility. The make-up tank 94 will typically have a float valve arranged therein which acts as a demand regulator, whereby when additional water is required it can be pumped to the boiler from the make-up tank 94 by means of a pump 96. The float valve in the make-up tank 96 will sense the lowered water level and permit the preheated water in line 70 to flow through pipe 90 through the manual valve 92 and into the make-up tank 94. The flow of water into the make-up tank 94 will decrease the water pressure in the main circulating loop 60, and permit additional water to enter the loop 60 from the main line 10. Similarly, the preheated water in line 70 can be employed in the lavatory tank 98 of the dry cleaning facility. The lavatory tank 98 is connected through manual valve 100 and pipes 90 and 102 to water line 70 in the circulating loop 60. This has the effect of utilizing coolant water that will ultimately be dumped down the drain for an additional use, i.e., in the wash room. It matters not if this water has been preheated but this use does provide an opportunity to input cooler water from the main line 10 into the loop 60. In other words, since the water has been inside the cooling loop it will have been preheated somewhat and would have already lost some of its ability to absorb heat in the various coils and condensors, accordingly, rather than simply dump it down the drain 20 it can be then passed through the make-up tank to the boiler and/or the lavatory tank. The admission of the cooler water to the system thereby further reduces the amount of water which will be passed by valve 84 and sent down the drain 20.

In the operation of the inventive system of FIG. 2, the pump 72 is turned on to circulate the coolant water through the cooling loop 60. In the event that the loop 60 is not full of water, then the water pressure in the input line 10 will serve to replenish the quantity of water in the coolant loop up to the capacity of the coils, condensors, and connective pipes. The water passes through the loop 60 in a continuous fashion until the thermostat 78 senses that the water in pipe 70 has increased in temperature to a point where it can no longer cool efficiently and is dumped down the drain 20. At that point fresh water is permitted to enter the system from the input main 10. Also, in the event that the float valve in the lavatory tank 98 senses a low tank water level and permits water to flow from line 70 through lines 90 and 102 into the tank 98 then additional cool water will enter the loop 60 from the input main. Similarly, if the float valve in the make-up tank 94 senses that the boiler has used water from tank 94 and admits water from line 70 through line 90, fresh water will also be permitted to enter the loop 60 from the input main 10. In all three cases, since the water pressure in the cooling loop 60 has been reduced, the main 10 will input some of the colder water from the main and the functioning of the various cooling coils will be enhanced.

It is understood of course that the foregoing is presented by way of example only and is not intended to limit the scope of the present invention, except as set forth in the appended claims. For example, the heated water in the loop could be passed through a heat exchanger or heat vector to aid in heating a part of the dry cleaning facility during the winter season or the heated water could be used in a laundry facility located in conjunction with the dry cleaning facility.

I claim:

1. A system for use in a dry cleaning facility comprising:
   apparatus for reclaiming and cooling dry cleaning fluids of the kind having condensing coils and cooling coils, respectively;
   means for connecting each of said coils of the apparatus in series to form a coolant loop;
   pump means connected to provide fluid circulation in said coolant loop;
   means for making a fluid connection from a pressurized source of water to said coolant loop;
   thermally operable valve means connected in said coolant loop; and
   means connecting said thermally operable valve means to a fluid waste line;
   said thermally operable valve including temperature sensing means arranged in said coolant loop for controlling the operation of said thermally operable valve upon exceeding a predetermined temperature,
   whereby upon sensing a temperature above the preselected temperature the thermally operable valve is operated to cause the water in the coolant loop to enter the fluid waste line, thereby permitting pressurized water to enter the loop from the source of the water.

2. The system of claim 1, further comprising a one way fluid direction limiting means arranged in said coolant line upstream of said pump means.

3. The system of claim 1, further comprising a one way fluid direction limiting means arranged in said coolant line downstream of said pump means.

4. The system of claim 1, further comprising make-up tank means for holding water prior to use in a boiler in the dry cleaning facility and means for connecting said make-up tank means to said coolant loop.

5. The system of claim 1, further comprising means for making a fluid connection between the water supply inlet of a lavatory tank in the dry cleaning facility and said coolant loop whereby said coolant loop provides the water supply for said lavatory tank.

6. The system of claim 4, wherein said means for connecting said make-up tank means to said coolant loop is arranged in said coolant loop at a point after said temperature sensing means.

7. The system of claim 4, further comprising a pump means connected between said make-up tank means and the boiler for supplying water contained within said make-up tank means to the boiler.

8. The system of claim 1, wherein said thermally operable valve means comprises an electrically operable valve and said temperature sensing means includes means for closing an electrical circuit upon the temperature of the coolant loop exceeding a predetermined temperature for controlling the operation of said electrically operable valve.

9. A system for use in a dry cleaning facility comprising:
   a dry cleaning fluid reclaimer for reclaiming dry cleaning fluid of the kind having a condensing coil;
   a dry cleaning fluid cooler for cooling dry cleaning fluid of the kind having a cooling coil;
   means connecting said condensing coil and said cooling coil in series to form a coolant recirculating loop;
   means connecting said coolant recirculating loop to a source of water having a pressure head for maintaining said coolant recirculating loop full of water;
   pump means arranged in said coolant recirculating loop for recirculating said water;
   thermostatically controlled valve means arranged in fluid communication with said coolant recirculating loop and connected to a fluid waste line, whereby upon said thermostatically controlled valve means sensing the water temperature of said coolant recirculating loop above a preselected temperature said thermostatically controlled valve connects said coolant recirculating loop to said waste water line, thereby dumping water in said coolant recirculating loop and fresh water is permitted to enter said coolant recirculating loop from said source of water.

10. The system of claim 9, further comprising unidirectional fluid limiting means arranged in said coolant recirculating loop upstream of said pump means.

11. The system of claim 9, further comprising unidirectional fluid limiting means arranged in said coolant recirculating loop downstream of said pump means.

12. The apparatus of claim 9, wherein the dry cleaning facility has a boiler, and further comprising means connected in said coolant recirculating loop for supplying the boiler with water therefrom.

13. The system of claim 12, wherein said means for supplying the boiler with water from the coolant recirculating loop comprise a boiler water make-up tank having a float valve therein and having an outlet connected to the boiler, and pipe means connected to said coolant recirculating loop and said float valve for feeding water to said make-up tank when said float valve is open.

14. The system of claim 9, wherein the dry cleaning facility has a lavatory and further comprising means connected in said coolant recirculating loop for supplying the lavatory tank with water from said coolant recirculating loop.

* * * * *